Figure 1:
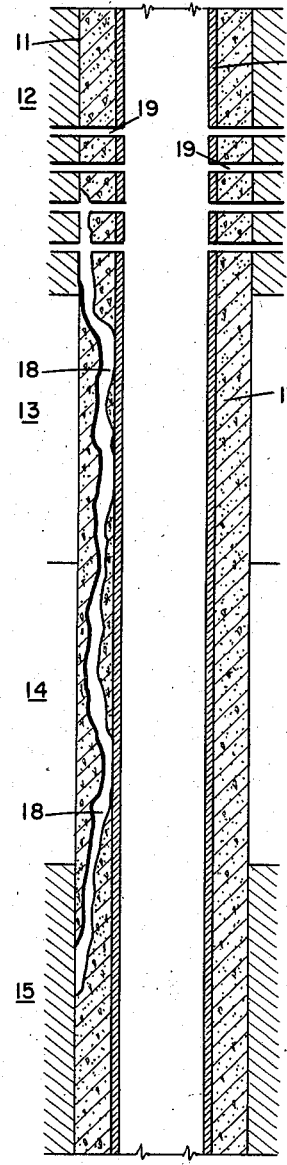

July 8, 1958     T. O. ALLEN ET AL     2,842,205

METHOD OF SERVICING WELLS

Filed Dec. 24, 1956     2 Sheets-Sheet 1

INVENTORS.
THOMAS O. ALLEN
LAURIE M. SLOAN.,
BY
ATTORNEY

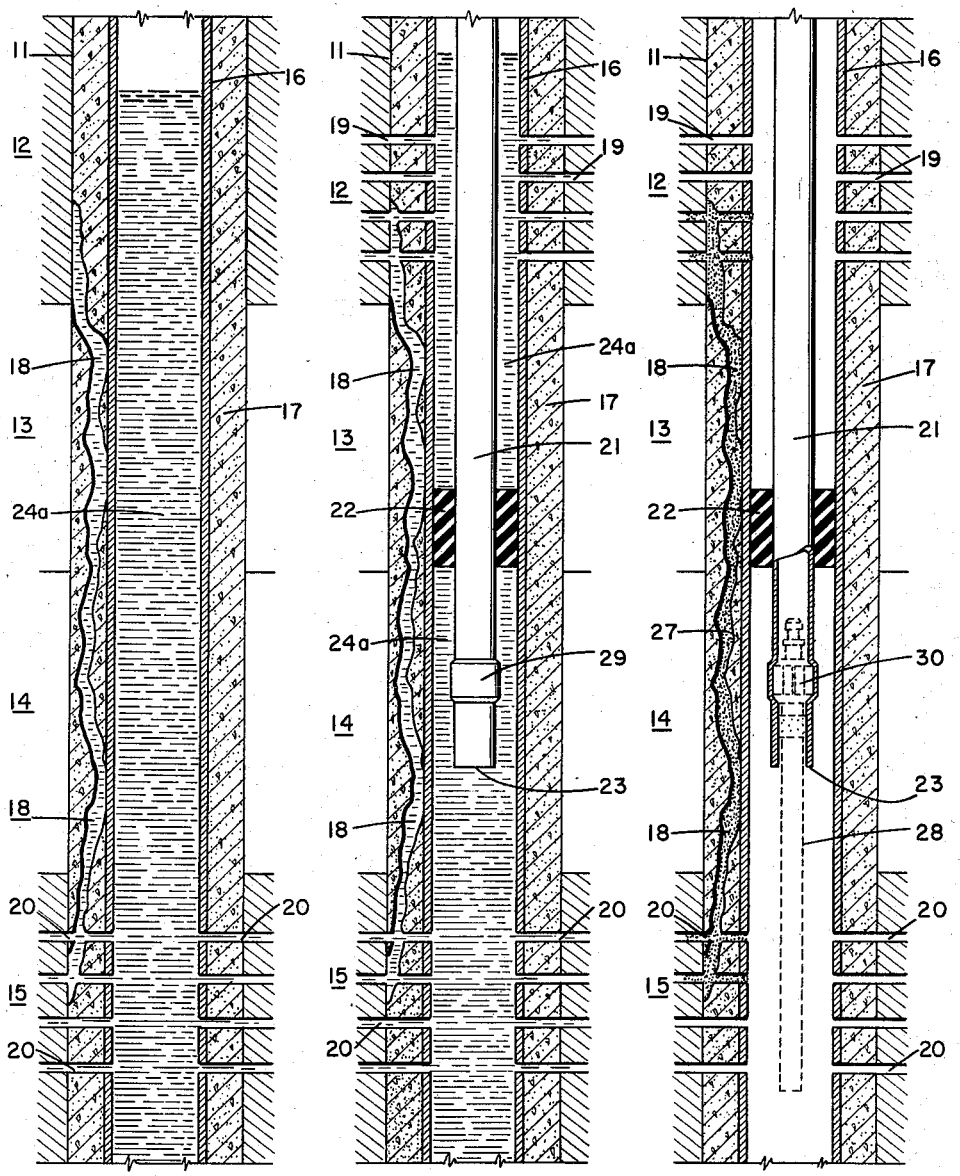

2,842,205

METHOD OF SERVICING WELLS

Thomas O. Allen, Bellaire, and Laurie M. Sloan, Houston, Tex., assignors, by mesne assignments, to Esso Research and Engineering Company, Elizabeth, N. J., a corporation of Delaware Application December 24, 1956, Serial No. 630,327

15 Claims. (Cl. 166—21)

The present invention is directed to a method for servicing a well. More particularly, the invention is directed to a method for sealing selectively a channel in a well back of a well casing. In its more specific aspects the invention is directed to closing off a channel in a well back of a well casing which fluidly communicates vertically spaced apart zones.

The present invention may be briefly described as a method for sealing selectively a channel in a well back of a well casing in which the channel communicates fluidly with less than all of a plurality of adjacent first perforations in the well casing. In the particular sealing procedure involved, fluid communication is established between the channel and less than all of a plurality of adjacent second perforations in the well casing vertically spaced apart from the first perforations. A low fluid loss non-plugging fluid is forced through the channel and following the low fluid loss non-plugging fluid a sealing material is also forced through the channel. The sealing material is maintained in the channel with pressure being applied thereto for a sufficient length of time to cause the sealing material to form a filter cake in and seal the channel. Thereafter, any excess sealing material is removed from the well casing and production is then had from the desired set of perforations.

The low fluid loss non-plugging fluid may suitably be a fluid such as an emulsion of an oily phase and a water phase and the like. Suitable materials have been amply described in Serial No. 567,604, now U. S. Patent 2,805,722, filed February 24, 1956, for Bryan E. Morgan and Gerald G. Priest. The fluids described in Serial No. 567,604 are eminently suitable in the practice of the present invention and comprise a stable emulsion of an oily medium and an aqueous medium which has a controllable density, the density of the emulsion being adjusted by dissolving a weighting agent in one of the phases of the emulsion to produce a solids-free emulsion. Other suitable non-plugging perforating fluids are described in pending application Serial No. 630,266, filed December 24, 1956, for Gerald G. Priest, Bryan E. Morgan, and Bertie F. Birdwell, in which an emulsion of an oily phase and an aqueous phase is described and claimed, the emulsion in Serial No. 630,266 being a stable emulsion employing as an emulsifying agent a water-soluble salt of purified lignin sulfonic acid for a water-soluble salt of lignin sulfonic acid containing a certain amount of ash and reducing sugars. Other non-plugging fluids suitable in the practice of the present invention are described in Serial No. 630,026, entitled Well Completion Fluids and filed December 24, 1956, for Gerald G. Priest, Bryan E. Morgan, Melba L. Lytle, Bertie F. Birdwell, and Joseph A. Caldwell. In Serial No. 630,026, a heat stable, non-corrosive emulsion is described and claimed in which an emulsifying agent is employed and in which the oily phase of the emulsion comprises a substantial amount of tetrachloroethylene, with one of the phases of the emulsion containing a corrosion inhibitor. These several perforating fluids described in the several applications have the characteristic of low filtration rate and further the characteristic of maintaining perforations open without damaging or injuring the permeability and porosity of the formation or interval with which they come into contact. In short, the low fluid loss non-plugging fluids suitable for use in the present invention have the characteristic of low filtration rate and of resisting entrance of other fluids into perforations in an earth formation. In addition, these fluids, particularly those described in the several applications, do not damage a formation with which they come into contact.

When a well casing is cemented in a well bore, a cement slurry is displaced into the annular space between the well casing and the borehole to fill this space and to seal the casing in the well bore. However, frequently the cement fails to seal completely the annular space and after the cement has set voids or channels may be left in the set cement which may permit the vertical movement of formation fluids in the well bore outside the well casing. The vertical movement of fluids in the well bore outside the well casing is quite deleterious and disadvantageous in that when the well casing is penetrated, communication between the channels outside the casing and the well casing may be established which will allow undesirable fluids from an interval or formation other than that perforated to flow into the well casing. For example, if the channel opens up into a water bearing sand, water influx into the casing may be serious and interfere with production of more desirable earth fluids.

In the present invention a method is described for sealing or repairing selectively the cement channels without sealing perforations in a well casing. In using the present invention where mud is used as a workover fluid, filling and temporary sealing of the channels back of the casing with mud is avoided which otherwise would deposit a mud filter cake that would prevent the complete filling and sealing of the channel with cement or other sealing material. The present invention also avoids the plugging with mud of perforations made in the well casing through which production is to be had on completion of the channel repair operation.

In workover operations where salt water or other high filtration rate fluids are employed as the workover fluid, the present invention offers considerable advantages by avoiding the loss of large quantities of workover fluid into the productive formation. In turn, this avoids a serious loss of hydrostatic pressure of the fluid in the well bore which otherwise might permit a well blowout. Furthermore, the present invention reduces well cleaning time required to restore production on completion of a job in that a clean perforating fluid and workover fluid is used. Also the usual serious reduction in permeability to hydrocarbons of the formation in the vicinity of the well completion interval is avoided since the workover interval is not invaded by the workover fluid employed in the present procedure.

Furthermore, the present invention will, in many cases, avoid the necessity for reperforating the interval to be produced following the sealing of the channel back of the well casing, inasmuch as the perforations through which cement has been circulated will be sealed selectively and successfully with the cement, whereas the perforations not in communication with the channel will not be sealed. In other words, the fluid employed in the practice of the present invention allows sealing selectively of perforations in communication with the channel while maintaining open the perforations not in communication with the channel.

In the present invention a low filtration rate non-plugging workover fluid allows fluid communication with the channel in the cement back of the well casing until sealing material, such as fluid cement, is displaced into the channel. Thus, the sealing material is directed selectively into the channel and the sealing material is prevented from entering perforations not in communication with the channel. As pointed out supra, this is quite advantageous in many ways and offers numerous advantages over the prior art.

The sealing material employed in the practice of the present invention may suitably be a cement of the modified type, such as described in the Salathiel Patent 2,582,459. The cement may suitably be an oil emulsion cement and may contain Bentonite, which is a montmorillonite, and other modifying agents. The cement is suitably a cement which remains fluid a sufficient length of time to allow excess fluid cement to be circulated from the casing. Such cement readily forms filter cakes opposite permeable formations while the remaining amount of the cement remains fluid in the well casing and may be removed. There are many modified cements having a retarded set which may be employed in the practice of the present invention, although the employment of the conventional Portland cement used in cementing well casing is not to be excluded from the practice of the present invention.

Suitably other sealing material, such as phenol-formaldehyde resins and urea-formaldehyde resins may be used. In a word, it is contemplated that plastic materials which are thermo-setting may be employed as the sealing material.

It is also contemplated that pressures may be used in the practice of the present invention to force the low fluid loss non-plugging fluid or liquid into the channels and also to force the sealing material into the channel after the fluid. This pressure may be applied through the tubing or on the casing-tubing annulus or on both the tubing and the casing-tubing annulus as may be desired. Application of pressure enhances the formation of filter cakes of cement to fill and seal the channel.

Figure 2:
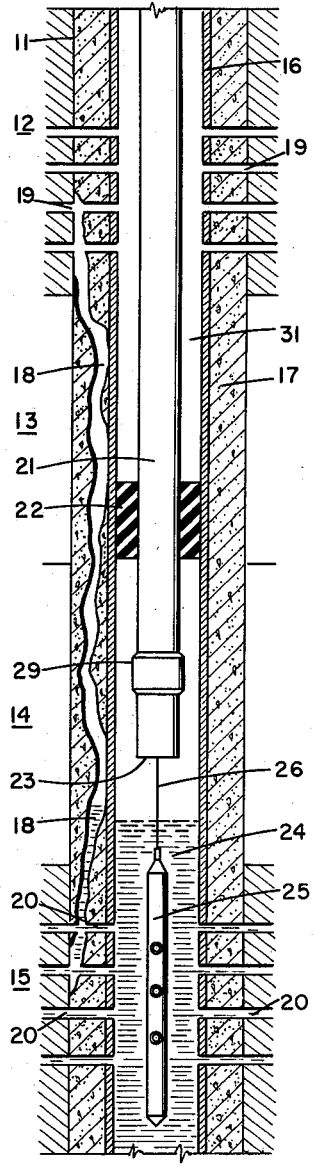
Figure 3:
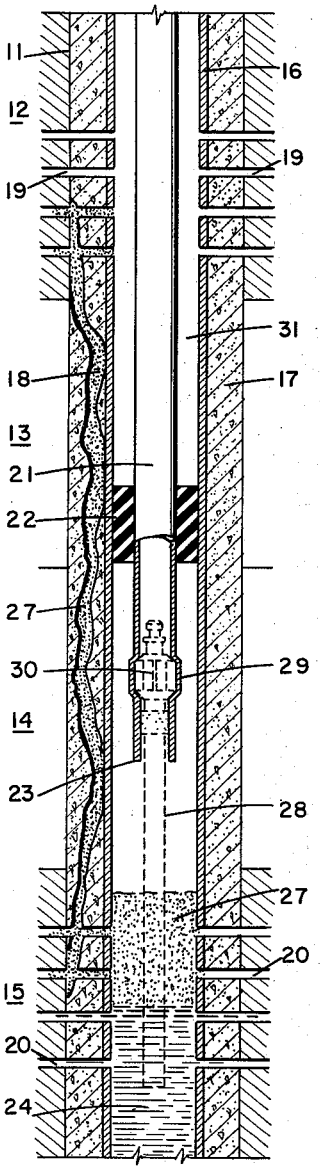

The invention will be further illustrated by reference to the drawing in which:

Figs. 1 to 3 illustrate a stepwise procedure for repairing a channel back of a well casing; and Figs. 4 to 6 also represent a stepwise procedure of a modified mode of repairing a channel back of a well casing.

Referring now to the drawing in which identical numerals will be employed to designate identical parts, numeral 11 designates a well bore drilled from the earth's surface to penetrate a plurality of subsurface intervals, zones, horizons, strata, formations, sands, and the like, 12, 13, 14 and 15. The well bore 11 has a casing 16 arranged therein and cemented in place with cement 17. The cementing operation in the present invention is faulty in that a channel such as 18 exists back of the casing 16 and extends from the formation or sand 15 to the formation or sand 12.

The casing 16 has been perforated in the interval 12 to form perforations 19 employing a perforator such as a bullet gun perforator, a shaped charge perforator, a chemical perforator or a mechanical perforator. Such perforator may be one that is run down the casing or one which may be sufficiently small in diameter to be run through the tubing set with its lower open end above the formation or sand to be perforated.

Referring to Fig. 1, it will be seen that fluid may pass from the formation 15 to communicate with the well casing 16 through the perforations 19. If the perforations 19 are producing excessive gas and it is desired to produce from interval 15 instead of interval 12, the channel 18 may prevent the exclusion of the fluids from 12 when the usual recompletion techniques are employed. In the present invention the channel 18 may be repaired as shown in Fig. 2. In repairing the channel 18, perforations 20 are formed in the interval 15. These perforations 20 may be formed by employing a perforator of the type illustrated before, which may be run through the casing or through a tubing such as 21 which may be run into the casing with a packer 22 to isolate the intervals 12 and 15, the tubing 21 being arranged with its lower open end 23 above the interval 15. Prior to forming the perforations 20, a body of non-plugging fluid, such as 24, is placed in the casing 16 to cover the region in the casing adjacent the interval 15. Thereafter a gun perforator, such as 25, which may be, for purposes of illustration only, a shaped charge perforator, is lowered on a wire line 26 until it is opposite the interval 15, and the perforator is then fired to form the perforations 20. Thereafter, pressure is imposed on the body 24 to cause a portion of the body to be forced through the channel 18 and to communicate with the perforations 19 in the interval 12 which communicate with the channel 18. The portion of the body of non-plugging fluid 24 which has entered the perforations 20 protects the perforations 20 which are not in communication with the channel 18. Thereafter, fluid cement may be forced down the tubing 21 to displace the body 24 and to cause the fluid cement to be forced up through the channel 18 as shown more clearly in Fig. 3, the gun perforator having been removed. The body of fluid cement is generally indicated by the numeral 27, while the non-plugging fluid which has entered the perforations 20 protects the perforations 20 not in communication with the channel 18. Pressure is imposed on the cement body 27 and on the channel 18 for a sufficient length of time which may range from about 5 to 30 minutes to cause the cement to form a filter cake filling the channel and become immobile therein.

Thereafter, the packer 22 is unseated and the tubing is lowered until its lower end is below the interval 15. The excess fluid cement 27 and the non-plugging fluid may then be circulated out of the well by reverse circulation down the annulus 31 and up the tubing 21 to the wellhead. After removal of the excess fluid cement and any excess non-plugging fluid the packer 22 is reset above the interval 15. After allowing time for the cement in the channel and in the perforations in communication with the channel to become set, production may be had from the perforations 20 not sealed with cement by swabbing the well or by reducing the pressure in the well by any well known means.

If a non-retrievable packer is used as the packer 22 instead of the retrievable tubing packer 22 contemplated in the detailed example just described, a tubing extension member 28 is lowered, before cementing the channel, on a wire line, not shown, through the tubing 21 and supported in a landing nipple 29 which seals and supports the tubing extension 28 in the tubing 21, the upper end of the tubing extension 28 being provided with a hanger 30 for supporting same, the tubing extension member being open on both ends. By removing the tubing sealing means from the packer 22 after cement has formed a filter cake in the channel 18, the excess fluid cement 27 and the non-plugging fluid may then be circulated out of the well by reverse circulation down the annulus 31 and up the tubular extension member 28 and then up the tubing 21 to the wellhead. After removal of the excess fluid cement and any excess non-plugging fluid, the tubing sealing means is reset in the packer 22, and after waiting for the cement in the channel to become set, production may be had from the perforations 20 not sealed with cement by swabbing the well or by reducing the pressure in the well by any well known means. The tubing extension member 28 may be left in place or may be removed as desired.

The tubing extension member 28 may also be used with a retrievable tubing packer 22 if desired. Its use eliminates the necessity for lowering the tubing 21 after cementing the channel, but instead of removing the tubing sealing means from the packer 22 as in the case of the non-retrievable packer, the retrievable packer 22 is unseated to permit reverse circulation for removal of excess cement, then the retrievable packer is reset after the reverse circulation is completed and before production of hydrocarbon fluids is initiated from the perforations 20 remaining open after the channel has been sealed.

It will be noted that, in this mode of the present invention, the packer 22 isolates the formation 12 from the formation 15 and the channel 18 is sealed allowing production to be had from the formation or interval 15.

While the intervals 12, 13, 14, and 15 have been described as being separate intervals or zones, it is to be clearly understood that this is by way of illustration and not by way of limitation, in that the intervals 12, 13, 14 and 15, while vertically displaced from each other, may be in the same sand, zone, horizon, strata, and the like.

Referring now to Figs. 4 to 6, another mode of practice of the present invention will be described where a channel, such as 18, exists back of the well casing 16 in the cement 17, as has been described with respect to Figs. 1 to 3. In this particular instance, perforations such as 20 have been formed in the interval 15, and some of these perforations 20 communicate with the channel 18 through which undesirable earth fluids such as gas are passing to be produced through perforations 20 in communication with the channel. In accordance with this mode of our invention, a body such as 24a of non-plugging perforating fluid of the type described supra is arranged in the well casing 16 in a sufficient amount to move the perforations 20 and to extend in the well upwardly a sufficient distance to cover a level in the casing adjacent the interval 12. After the non-plugging perforating fluid 24a is placed in the casing 16, the casing 16 is then perforated in the interval 12 to form the perforations 19. This may suitably be done by lowering a gun perforator such as 25 through the casing 16, if no tubing is arranged therein, or lowering a gun perforator such as 25 which is of a dimension small enough to be lowered through a tubing such as 21. Assuming that the gun perforator is a casing gun perforator, the perforations 19 are made in the casing 16, and thereafter the tubing 21 is run into the perforated casing with a packer 22 which is set between the intervals 12 and 15. The non-plugging perforating fluid 24a is then above and below the packer, and by imposing fluid pressure through the tubing 21, flow of fluid through the casing-tubing annulus 31 at the wellhead will indicate that a channel 18 exists back of the casing 16. However, the non-plugging perforating fluid 24a will protect the perforations 19 and 20 not in communication with the channel 18. Thereafter, as described with respect to Figs. 1 to 3, a body of a fluid cementitious material such as a Portland cement slurry, which may be an oil-emulsion slurry, or a slurry of the type described in the Salathiel patent supra, or a plastic material, is forced down the tubing 21 and through the perforations 20 in communication with the channel 18 and into the perforations 19 in communication with the channel 18, filling and sealing same with pressure being imposed as desired, either on the annulus 31, or through the tubing 21, or on the annulus 31 and on the tubing 21 to cause the cement to deposit a filter cake filling the channel 18.

The body of cement and any non-plugging fluid is then removed by unseating the packer 22 and circulating the excess fluid cement by flowing a fluid down through the annulus 31 up through the tubing extension 28 and up the tubing 21. It will be seen that in these operations the perforations 20 not in communication with the channel 18 and the perforations 19 not in commuication with the channel 18 have been selectively protected against the cement and against any drilling mud. Fluid production may then be reestablished from interval 15 without reperforating after resetting the packer 22 between intervals 12 and 15.

It is contemplated in the practice of the present invention that rather than circulating out the cement, particularly where a modified cement is not used, the cement may be drilled out.

In order to describe the invention further, an operation was performed in a field in Texas in a well which was producing oil with a high gas-oil ratio. These operations were conducted in a procedure as outlined with respect to Figs. 1 to 3. It was suspected that a channel existed in the cement between two intervals, such as 12 and 15. A low fluid loss non-plugging fluid was displaced into the well opposite the interval, such as 15, and extending several feet above that interval. The casing was then perforated in the interval equivalent to 15 and well tubing was run with a non-retrievable packer as illustrated in Fig. 2. Fluid pressure was then applied below the packer to the equivalent of perforations 20. The fluid in the equivalent of channel 18 and the fluid in the perforations equivalent to 20 were displaced by the pressured fluid through the channel and into the equivalent of the tubing-casing annulus 31 through the equivalent of perforations 19 communicating with the channel. The return of fluid to the surface in this particular well gave a positive indication of the presence of a channel. A tubing extension member such as 28 was installed by wire line in the tubing 21, being seated therein by means of a hanger such as 30 and a landing nipple such as 29. A modified cement slurry was circulated into the channel by pumping it down the tubing and displacing it with another fluid. Application of fluid pressure less than the pressure required to fracture the formation to the fluids in the tubing and tubing-casing annulus caused dehydration of the cement in the channel 18 in communication with the permeable formations 12 and 15. Excess cementing material was then circulated from the well after removing the tubing sealing means from the non-retrievable packer. In this particular operation, the tubing extension member was retrieved and fluid production was then initiated from the perforations equivalent to 20 without requiring reperforating in the interval equivalent to 15, since the non-plugging fluid prevented the cementing material from entering and sealing the perforations 20 which were not in communication with the channel 18. This operation was quite successful and production was then had again without reperforating.

In another mode of operation similar to that of Fig. 1, salt water may be entering the well through the cement channel from a level below the perforations such as 19. The channel 18 may be sealed in a similar manner to that described, but in this particular instance, the non-plugging fluid may be employed in sufficient amount to cover the interval 12 and the interval 15 in the well casing. Also, after perforating to form the perforations 20 and employing cement to seal the channel 18, cement may be left in the well bore extending to a level above the perforations 20. Production of reservoir fluids may then be resumed through the perforations 19 without reperforating the interval 12.

In another operation where excessive amounts of salt water are being produced from an interval such as 15 as illustrated in Fig. 4, it may be desirable to recomplete the well through perforations such as 19 in the interval 12. In this instance, like in the other instances, a channel such as 18 may exist between the two intervals which would permit the continued intrusion of water from the interval 15. In this particular operation a low fluid loss non-plugging fluid is employed in an amount sufficient to fill the casing from the interval 15 extending through the interval 12, then the perforations 19 are placed in the interval 12. As shown in Fig. 5, a sealing means, such as 22, which may be a retrievable cementing packer or a cement retainer, is set between the perforated intervals such as 12 and 15 and tubing is connected to the sealing means as shown in Fig. 5. Fluid pressure is applied through the tubing to the interval below the cement retainer and causes movement of fluids up through the channel 18 which is reflected by flow of well fluids to the surface through the tubing-casing annulus 31. Portland cement slurry or other sealing material, as illustrated, may be circulated down the tubing and out through the perforations 20 up the channel 18 and through the perforations 19 in the interval 12. Of course, it is realized that the cement flows only through the perforations 19 and 20 in communication with the channel 18. Fluid pressure is applied to the well bore through both the tubing and the tubing-casing annulus and causes dehydration of the cementitious material in the channel, sealing the channel. Excess cementitious material is circulated from the well bore down to the cement retainer or other sealing means 22, or it may be drilled from the casing down to that depth after the cement has been set. The well is then produced through the perforations 19 not in communication with the channel 18, which has been sealed, the non-plugging fluid protecting the perforations 19 which are not in communication with the channel 18.

It will be seen from the foregoing description taken with the drawing and the several examples that a new and useful and quite advantageous procedure has been described in which a channel is selectively sealed back of a well casing by employing a non-plugging fluid which allows a sealing material to enter only perforations in communication with the channel while protecting the perforations not in communication with the channel. The present invention has been employed successfully in field operations and is of demonstrated commercial worth.

The nature and objects of the present invention having been completely described and illustrated, what we wish to claim as new and useful and secure by Letters Patent is:

1. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises establishing fluid communication between said channel and less than all of a plurality of second perforations in said casing in said second zone vertically spaced apart from the first perforations, forcing a low fluid loss non-plugging fluid through said channel through said perforations in fluid communication with said channel, then forcing a sealing material through said channel after said fluid, and maintaining said sealing material in said channel and said perforations in fluid communication with said channel a sufficient length of time for it to seal said channel and said perforations in communication with said channel, said low fluid loss non-plugging fluid having the characteristics of resisting entrance of other fluids into the perforations other than the perforations in fluid communication with the channel.

2. A method in accordance with claim 1 in which the casing is isolated between the first and second perforations and in which production of well fluids is initiated through one of the plurality of first and second perforations other than the sealed perforations after sealing the channel.

3. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises placing a body of a low fluid loss non-plugging fluid in said well casing at a level adjacent said second zone and vertically removed from the first perforations, perforating the well casing in said body to form a plurality of second perforations in said casing in said second zone and thereby establishing fluid communication between said channel and less than all of said plurality of second perforations, forcing at least a portion of said body through said channel from said first perforations to said second perforations in fluid communication with said channel, then forcing a sealing material through said channel after said body, and maintaining said sealing material in said channel and said perforations in fluid communication with said channel a sufficient length of time for it to set and seal said channel perforations in fluid communication with said channel, said low fluid loss non-plugging fluid having the characteristics of resisting entrance of other fluids into the perforations other than the perforations in fluid communication with the channel.

4. A method in accordance with claim 3 in which the casing between the first perforations and the level where the body is placed is isolated prior to perforating the casing in said body and in which production of well fluids is initiated through the second perforations after sealing the channel.

5. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises placing a body of a low fluid loss non-plugging fluid in said well casing adjacent said plurality of first perforations, establishing fluid communication between said channel and less than all of a plurality of second perforations in said casing adjacent said second zone and vertically spaced apart from the first perforations, forcing at least a portion of said body through said channel from the first perforations in fluid communication with said channel to the second perforations in fluid communication with said channel, then forcing a sealing material through said channel after said body, and maintaining said sealing material in said channel a sufficient length of time for it to seal said channel and perforations in fluid communication with said channel, said low fluid loss non-plugging fluid having the characteristics of resisting entrance of other fluids into the perforations other than the perforations in fluid communication with the channel.

6. A method in accordance with claim 5 in which the sealing material is fluid cement.

7. A method in accordance with claim 5 in which the sealing material is a plastic.

8. A method in accordance with claim 5 in which the non-plugging fluid is a stable emulsion of an oily phase and an aqueous phase.

9. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises placing a low fluid loss non-plugging fluid in said well casing adjacent said plurality of first perforations, establishing fluid communication between said channel and less than all of a plurality of second perforations in said casing adjacent said second zone and vertically spaced apart from the first perforations, applying pressure to said body to force at least a portion of said body through said channel from the first perforations in fluid communication with said channel to the second perforations in fluid communication with said channel, placing a sealing material in said well casing adjacent said plurality of first perforations, then forcing said sealing material through said channel after said body, and maintaining said sealing material in said channel a sufficient length of time for it to seal said channel and perforations in fluid communication with said channel, said low fluid loss non-plugging fluid having the characteristics of resisting entrance of other fluids into the perforations other than the perforations in fluid communication with the channel.

10. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises placing a sufficient amount of a low fluid loss non-plugging fluid in said casing to cover said first perforations and to extend vertically in said casing a sufficient distance to a level adjacent the terminus of said channel in said second zone, perforating the casing in said fluid in said second zone to form a plurality of second perforations and thereby establishing fluid communication between said channel and less than all of said plurality of second perforations, forcing at least a portion of said fluid through said channel from the first to the second perforations in fluid communication with said channel, then forcing a sealing material through said channel after said fluid, and maintaining said sealing material in said channel and perforations in fluid communication with said channel a sufficient length of time for it to form a filter cake in and seal said channel and perforations in fluid communication with said channel, said low fluid loss non-plugging fluid having the characteristics of resisting entrance of other fluids into the perforations other than the perforations in fluid communication with the channel.

11. A method in accordance with claim 10 in which the well is provided with a tubing and in which the casing is isolated at a level between the perforations and pressure is applied on said fluid and on said sealing material through the tubing.

12. A method in accordance with claim 11 in which pressure is also applied in the annulus between the tubing and casing on the fluid and sealing material.

13. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises establishing fluid communication between said channel and less than all of a plurality of second perforations in said casing in said second zone vertically spaced apart from the first perforations, forcing a low fluid loss non-plugging fluid through said channel from one to the other of the perforations in fluid communication with said channel, then forcing a sealing material through said channel after said fluid, maintaining said sealing material in said channel and said perforations in fluid communication with said channel a sufficient length of time for it to seal said channel and said perforations in fluid communication with said channel, said low fluid loss non-plugging fluid having the characteristics of resisting entrance of other fluids into the perforations other than the perforations in fluid communication with the channel, and then producing well fluids through one of the plurality of first and second perforations other than the sealed perforations.

14. A method for sealing a channel in a well back of a well casing in which the channel communicates fluidly with vertically spaced apart zones and fluid from a first of said zones is invading a second of said zones and in which the channel also communicates fluidly with less than all of a plurality of first perforations in said casing in said first zone which comprises establishing fluid communication between said channel and less than all of a plurality of second perforations in said casing in said second zone vertically spaced apart from the first perforations, forcing a low fluid loss non-plugging fluid through said channel from one to the other of the perforations in fluid communication with said channel, then forcing a sealing material through said channel after said fluid, maintaining said sealing material in said channel and said perforations in fluid communication with said channel a sufficient length of time for it to form a filter cake in and seal said channel and said perforations in fluid communication with said channel, and removing any excess sealing material from the casing, said low fluid loss non-plugging fluid having the characteristics of resisting entrance of other fluids into the perforations other than the perforations in fluid communication with the channel.

15. A method in accordance with claim 14 in which the sealing material is fluid cement and the excess is removed by circulation.

References Cited in the file of this patent
UNITED STATES PATENTS

| | | |
|---|---|---|
| 2,223,397 | White et al. | Dec. 3, 1940 |
| 2,718,264 | Allen et al. | Sept. 20, 1955 |